Patented Sept. 1, 1936

2,053,013

UNITED STATES PATENT OFFICE 2,053,013

PROCESS OF PREPARING STARCH PRODUCTS

Johannes Hendrik van der Meulen, Arnhem, Netherlands

No Drawing. Application May 2, 1934, Serial No. 723,616. In Austria May 6, 1933

4 Claims. (Cl. 127—33)

When hypohalogenites react with starch or starch containing materials in the presence of free hydroxyl ions simultaneously with nitrogen-hydrogen compounds or the derivatives thereof, such as ammonia, ammonium bases, hydrazine, amines or amides, pyridin or the like, or if the reaction of the hypohalogenites is followed by a reaction of the said nitrogen-hydrogen compounds, substances are obtained which are readily soluble in hot water, the solutions thus formed remaining clear and homogeneous for a long period of time.

The reaction of the hypochlorites is different from that of the hypobromites. In order to prepare soluble starch, when applying hypochlorites, it is necessary to work in the above indicated way, i. e. that the reaction of the hypochlorites must be accompanied or followed by a reaction of the nitrogen-hydrogen compounds, because hypochlorites alone, without increasing the temperature, are not able to convert the starch, but hypobromites alone are able to cause this conversion.

If e. g. hypobromites at room temperature react with starch, one obtains, after gelatinization, a paste-like gel which can be easily spread and which will not easily dry out, so that this product has very valuable properties for industrial purposes.

The different properties in this respect of the hypochlorites and the hypobromites follow from the following:

If hypochlorites react with starch at ordinary temperature, and if one washes out with water, and finally ammonia is added, then a product is obtained, which in its properties resembles the original substance nearly completely. If, however, the starch is treated with hypobromites, a product is obtained showing after washing properties which are quite different from those of the original material. If e. g. potato starch is gelatinized, a starch gel is obtained with rubber-like appearance; if, however, the starch is pre-treated with hypobromites, a gel of a paste-like appearance is obtained after gelatinization, which by the addition of small quantities of alkaline reacting substances, such as ammonia, borax, sodium bicarbonate and the like may be peptized to a thin fluid sol, which does not thicken and which remains liquid for a long period. This starch solution gives with iodine-potassium iodide solution an intensively blue colouring and does not reduce copper salt solutions such as Fehling's solution and the like as used in analytical chemistry. From this it appears that no appreciable decomposition (hydrolysis to sugars) has taken place.

The products obtained in this way are of a very great importance for sizing and laundry purposes. The solutions will impregnate the fibres evenly and after ironing or calendering the starch-skin is present within the fibre and gives the same a "full" and soft feeling without becoming brittle. It is evident that the usual substances may be added to this starch.

Although the hypobromite has a very special action in making starch soluble, it is not necessary to use a hypobromite solution alone. In many cases the hypobromite may be substituted in part and even in a large part by hypochlorite.

Examples (1) 1 kg. of potato- or tapioca-starch is stirred with 1500 ccm. of water and 400 ccm. of normal hypobromite solution (80 g. of bromine and 40 g. NaOH per liter) are added. After half an hour the liquid is sucked from the starch, and the latter is well washed and dried in the air.

(2) 1 kg. of potato- or tapioca-starch is stirred with 1500 ccm. of water, thereupon 100 ccm. of normal hypobromite solution and 100 ccm. of 4 normal hypochlorite solution are added. After half an hour the mass is filtered with a suction-filter, the starch is well washed and dried at low temperature.

Instead of the above mentioned kinds of starch also other starches may be used. The quantities of hypobromite and hypochlorite may be varied within wide limits and after gelatinization thick or thin-liquid solutions of great durability are obtained, depending upon the quantities used. The viscosity of the sols may be varied by varying the quantity of the hypochlorite used, but also by means of the additions, such as lye, alkali carbonates, borates, ammonia etc. used in gelatinization. It is to be noted that only small quantities of the additions are necessary.

As used in the present specification, the term "gelatinization" relates to the modification which the present process effects upon raw starch, whereby it becomes easily miscible with water to form a smooth paste which does not dry out quickly, but after which modification, the starch is not changed to decomposition products or dextrine, glucose and the like, and which starch gives the normal iodine color reaction.

In my Patent No. 2,053,012 granted September 1, 1936, I have described and claimed a process of converting raw starch into soluble starch by treatment with a hypohalogenite in the presence of a nitrogen-hydrogen compound.

I claim:—

1. A process of converting starch into soluble starch, which comprises treating such starch with a mixture of a hypobromite and a hypochlorite in an aqueous medium.

2. A process of converting starch into soluble starch, which comprises treating such starch in the form of a suspension in water with a hypobromite, and thereafter peptizing said starch by means of alkaline substances to form starch solutions which do not thicken and which remain liquid for a long time.

3. A process of converting starch into soluble starch, which comprises treating such starch with a hypobromite in the proportion of about 1000 parts of starch, about 1500 parts of water and 400 parts of normal hypobromite solution.

4. A process of converting starch into soluble starch which comprises treating such starch in suspension in water with a mixture of a hypobromite and a hypochlorite.

JOHANNES HENDRIK VAN DER MEULEN.